W. D. BOYCE.
PIE CUTTER.
APPLICATION FILED MAY 21, 1920.

1,371,195.

Patented Mar. 8, 1921.

Walter D. Boyce
INVENTOR

BY Victor J. Evans
ATTORNEY

UNITED STATES PATENT OFFICE.

WALTER D. BOYCE, OF McGREGOR, IOWA.

PIE-CUTTER.

1,371,195.  Specification of Letters Patent.  Patented Mar. 8, 1921.

Application filed May 21, 1920. Serial No. 383,210.

*To all whom it may concern:*

Be it known that I, WALTER D. BOYCE, a citizen of the United States, residing at McGregor, in the county of Clayton and State of Iowa, have invented new and useful Improvements in Pie-Cutters, of which the following is a specification.

This invention relates to a pie cutter and has for its primary object the construction of a device of this character that will accurately cut a pie into equal portions.

An object of the invention is the construction of the cutting member and so arranging the same that different cutting members may be substituted for making different cuts.

A feature of the invention is the novel manner of constructing each blade so that the pie crust will be completely cut.

With these and other objects in view the invention will be better understood from the following detailed description taken in connection with the accompanying drawing wherein.

Figure 1:
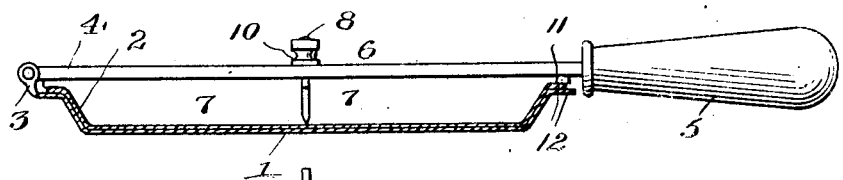
Figure 1 is a sectional view through my invention shown in applied position.
Figure 2:
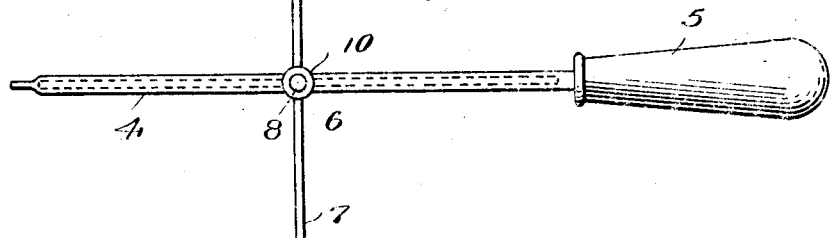
Fig. 2 is a top plan view of the cutting member detached from the tray.
Figure 3:
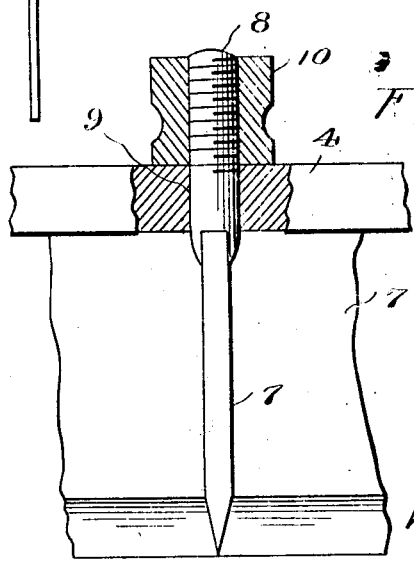
Fig. 3 is an enlarged sectional view illustrating how the blades are connected to the rod.

Again referring to the drawing illustrating one construction of my invention the numeral 1 designates a tray of a size and shape to snugly support the pie pan 2. Projecting from the flange of the tray is a bearing 3 to which one end of the rod 4 is pivotally connected. The other end of the rod has connected thereto the handle 5. The cutting member 6 consists of a plurality of blades 7 which may be of any number and extend at various angles to each other. These blades may be manufactured and associated in any advantageous manner and at their juncture are provided with a screw 8 passing through the opening 9 in the rod 4 and engaged by a thumb screw 10. From this construction it will be seen that different cutting members may be substituted for making different cuts and besides the parts may be readily disconnected for cleaning purposes. Each blade is further provided with an extension 11 coöperating with the flange 12 of the pie pan to cut that portion of the pie crust that usually lies upon the flange. Thus it will be seen that a clean, accurate cut is accomplished with my device.

It is, of course, to be understood that the invention may be constructed in various other manners and the parts associated in different relations and, therefore, I do not desire to be limited in any manner except as set forth in the claims hereunto appended.

Having thus described my invention what I claim is:

1. A pie cutter comprising a pan-shaped tray for receiving the pie pan, a bearing extending therefrom, a rod having one end pivotally connected to the bearing, a handle connected to the other end of the rod, and a cutting member consisting of a plurality of blades connected together, a screw projecting therefrom through the rod, and a nut mounted on the screw for detachably connecting the member to the rod.

2. A pie cutter comprising a pan-shaped tray for receiving the pie pan, a bearing extending therefrom, a rod having one end pivotally connected to the bearing, a handle connected to the other end of the rod, and a cuttting member consisting of a plurality of blades connected together, a screw projecting therefrom through the rod, and a nut mounted on the screw for detachably connecting the member to the rod, each of the blades being provided with an extension passing over the flange of the pie plate.

3. A pie cutter comprising a tray of pie pan shape for receiving the pie pan, a rod swingingly connected at one end to the flange of the tray, a handle connected to the rod, and a cutter detachably connected to the rod consisting of a plurality of blades extending at various angles to each other, each blade being provided with an extension overlapping the flange portion of the pie pan when the blade is in cutting position thereby cutting the crust upon said flange portion.

In testimony whereof I affix my signature.

WALTER D. BOYCE.